US009238469B2

(12) United States Patent
Mitani et al.

(10) Patent No.: US 9,238,469 B2
(45) Date of Patent: Jan. 19, 2016

(54) INTERIOR EQUIPMENT INSTALLATION STRUCTURE FOR RAILCAR

(75) Inventors: Yuichirou Mitani, Kakogawa (JP); Takashi Azuma, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 237 days.

(21) Appl. No.: 13/994,432

(22) PCT Filed: Dec. 9, 2011

(86) PCT No.: PCT/JP2011/006892
§ 371 (c)(1),
(2), (4) Date: Aug. 8, 2013

(87) PCT Pub. No.: WO2012/081211
PCT Pub. Date: Jun. 21, 2012

(65) Prior Publication Data
US 2013/0319282 A1 Dec. 5, 2013

(30) Foreign Application Priority Data
Dec. 14, 2010 (JP) .................................. 2010-277578

(51) Int. Cl.
*B61D 17/12* (2006.01)
*B61D 17/00* (2006.01)
(Continued)

(52) U.S. Cl.
CPC ................. *B61D 17/00* (2013.01); *B61D 17/12* (2013.01); *B61D 27/00* (2013.01); *B60Q 3/025* (2013.01)

(58) Field of Classification Search
CPC ......... B61D 17/00; B61D 17/12; B61D 17/18
USPC ....................................................... 105/397
See application file for complete search history.

(56) References Cited

U.S. PATENT DOCUMENTS 2,925,050 A * 2/1960 Candlin, Jr. et al. .......... 105/397
3,035,161 A * 5/1962 Kalt ............................... 362/479
5,333,554 A * 8/1994 Yamada et al. ............... 105/397
(Continued)

FOREIGN PATENT DOCUMENTS

JP   A-7-172306   7/1995
JP   A-2000-229569   8/2000
(Continued)

OTHER PUBLICATIONS

International Search Report issued in International Patent Application No. PCT/JP2011/006892 dated Mar. 13, 2012.

*Primary Examiner* — Zachary Kuhfuss
(74) *Attorney, Agent, or Firm* — Oliff PLC

(57) ABSTRACT

In the interior equipment installation structure for a railcar according to the present invention, a first installation member is mounted to a roof body shell along the car longitudinal direction or the car width direction. Second installation members are attached to the first installation member using mechanical fastening tools such as bolts with the positions of the second installation members adjusted in the up-down direction of the car. The second installation members are used for installing lighting appliances such as fluorescent lights, each has a size corresponding to each of the lighting appliances, and are continuously installed. There are portions in which plate members are overlapped with each other between respective adjacent ones of the second installation members, and hand strap receivers are installed in these portions.

10 Claims, 9 Drawing Sheets

(51) Int. Cl.
  *B61D 27/00* (2006.01)
  *B60Q 3/02* (2006.01)

(56) References Cited

U.S. PATENT DOCUMENTS 6,196,136 B1 * 3/2001 Yoshizaki et al. ............ 105/396
7,392,750 B2 * 7/2008 Schiefer ........................ 105/397
2006/0207471 A1 * 9/2006 Todori et al. .................. 105/396

FOREIGN PATENT DOCUMENTS

| JP | A-2001-63564 | 3/2001 |
| JP | A-2002-356162 | 12/2002 |
| JP | A-2005-125998 | 5/2005 |

* cited by examiner

INTERIOR EQUIPMENT INSTALLATION STRUCTURE FOR RAILCAR

TECHNICAL FIELD

The present invention relates to an interior equipment installation structure for installing car interior equipment and a railcar.

BACKGROUND ART

There is installed car interior equipment (ceiling interior equipment) such as an air conditioner, an air conditioning duct, a fluorescent light, a hand strap, and a side ceiling inside a carbody shell of a railcar, for example, between a roof body shell and a compartment.

A railcar has, for example, a wide compartment space having a size of approximately 3 m in width and approximately 20 m in length in a planar view. Therefore, since passengers can look over the above car interior equipment in a wide area, it is required to install all pieces thereof so as to look nice. In particular, car interior equipment installed in a ceiling has a large impact on fine appearance to passengers. Therefore, when pieces of car interior equipment having the same shape are regularly installed (for example, continuously installed in a repetitive manner) in a car longitudinal direction, it is necessary to accurately install all pieces thereof so that the car interior equipment can look nice as a whole.

On the other hand, a body shell of a railcar is generally composed of a weld assembly of combined thin stainless steel (SUS) plates, or a weld assembly of aluminum sections or plate materials. Since such a body shell is manufactured mainly by welding, it is difficult to manufacture the body shell itself with high accuracy. Therefore, the body shell is generally manufactured so that a manufacturing error falls within the range of tolerance.

In particular, when various pieces of car interior equipment are installed, dedicated installation members for the respective pieces thereof are often used, and the pieces of car interior equipment are installed in a carbody shell (a roof body shell, for example) through the installation members by welding, bolt fastening or the like. However, since a sufficient stiffness for supporting the car interior equipment is required in each of the installation members, it is difficult to provide an adjustment mechanism for absorbing the above tolerance in each of the installation members when composed of a single body.

Therefore, conventionally, in order to install the car interior equipment as described above so as to look nice, an adjustment spacer such as a liner made of vinyl chloride is provided between installation members and the car interior equipment so as to absorb the above tolerance, and the car interior equipment is installed so as to look nice with appropriately changing the thickness or the like of the adjustment spacer depending on the completion state of the body shell.

However, in conventional car interior equipment, installation members are required for the respective pieces thereof. Therefore, it is necessary to perform the adjustment for each piece of the car interior equipment. Accordingly, it takes extremely long time for the adjustment operation, skill is required for the adjustment, and there may be variations in workmanship according to operators.

On the other hand, there is proposed an interior panel installation structure for a railcar using a leaf spring in Patent Document 1. In this installation structure, a metal spring having an appropriate reaction force is provided in a region to be mounted by a mounting screw of an interior panel between a support frame member and the interior panel. This makes it possible to install the interior panel in an appropriate position without performing a level adjustment operation by providing a level adjustment liner.

Further, there are proposed adjustment mechanisms regarding the car longitudinal direction utilizing a suspending groove in Patent Documents 2 and 3. In an outfitting structure for a car of Patent Document 2, a mounting frame member can be provided between a roof body shell and a floor body shell in a standing manner only by fixing an upper end of the mounting frame member to an adaptor fitting attached to the roof body shell and fixing a lower end of the mounting frame member to a support fitting attached to the floor body shell. This configuration makes it possible to easily provide the mounting frame member in a standing manner with various outfittings for a car mounted thereto. Therefore, by previously mounting outfittings for a car to the mounting frame member by an outwork operation, shortening work period and cost reduction can be achieved.

Further, in an inner outfitting structure of Patent Document 3, a plurality of support tools for supporting an outfitting are installed in an inner surface of a body shell along the car longitudinal direction. A support fixing portion into which fastening means for fixing the outfitting is fitted is formed on each of the support tools along the car longitudinal direction. The outfitting is provided with a plurality of fixation portions which are fixed to the plurality of support tools. The fixation portions are configured so that the fixation position to the fastening means can be adjusted in a direction intersecting the car longitudinal direction. Therefore, the positioning between the outfitting support tools and the outfitting can be easily performed, and a conventionally performed direct positioning between a support member and an outfitting is therefore no longer required, thereby improving the workability.

Further, in an interior equipment installation structure of Patent Document 4, screw insertion holes are provided, in an overlapped manner, on an inside panel and an inner frame which is arranged on a surface of the inner panel, the surface facing outside of a carbody. A screw insertion hole of interior equipment are matched with these screw insertion holes, and a set screw inserted into these matched insertion holes from the interior equipment side is screwed into a female screw hole of a screw seat which is attached to a surface of the inner frame, the surface facing outside of the carbody, to thereby install the interior equipment therein. Further, at least each of the screw insertion holes on the inside panel and the inner frame is formed to have a larger diameter than the diameter of the female screw hole, and a guide frame is provided on the surface of the inner frame, the surface facing outside of the carbody, to thereby slidably support the screw seat inside the guide frame. Accordingly, when interior equipment is installed through the inner panel of the carbody, it is possible to install the interior equipment in a predetermined position in a simple manner while absorbing a manufacturing error of the carbody or the interior equipment.

PRIOR ART DOCUMENTS

Patent Documents

Patent Document 1: Japanese Unexamined Patent Application Publication No. 2000-229569
Patent Document 2: Japanese Unexamined Patent Application Publication No. 2005-125998
Patent Document 3: Japanese Unexamined Patent Application Publication No. H07-172306

Patent Document 4: Japanese Unexamined Patent Application Publication No. 2002-356162

SUMMARY OF THE INVENTION

Problems to be Solved by the Invention

Although the installation structure of Patent Document 1 can make the level adjustment operation easy, the level adjustment is only for a lightweight interior panel, and adjustment for relatively heavy car interior equipment is not disclosed therein. In addition, since the adjustment is performed using a leaf spring, the adjustable range thereof is narrow.

Further, since the structure of Patent Document 2 uses the mounting frame member extending in the car up-down direction, the number of parts is increased. Further, the technique of Patent Document 3 cannot be employed as it is as a position adjustment mechanism for the car up-down direction.

Further, in the structure of Patent Document 4, each of the screw insertion holes on the inside panel and the inner frame is formed to have a larger diameter than the diameter of the female screw hole, and the guide frame is provided on the surface of the inner frame, the surface facing outside of the carbody, to thereby slidably support the screw seat inside the guide frame. Therefore, the number of parts is large, and the structure thereof is complicated. In addition, since the adjustable range of the heavy car interior equipment (the luggage shelf bracket) itself is made large to perform the position adjustment and the installation, the installation workability is low. Further, since the position adjustment is required to be performed for each piece of the car interior equipment, the installation workability is low also in this point.

It is, therefore, an object of the present invention to provide an interior equipment installation structure and a railcar capable of performing an easy installation operation of car interior equipment, and installing the car interior equipment so as to look nice.

Solutions to the Problems

An interior equipment installation structure according to an embodiment of the present invention is provided with a first installation member capable of being mounted to a roof body shell of a railcar, and second installation members each including a horizontal portion capable of installing car interior equipment therein and vertical portions provided at respective long side ends of the horizontal portion and attached to the first installation member so that the positions of the vertical portions can be adjusted in the up-down direction.

With this configuration, the second installation members are attached to the first installation member so that the positions thereof can be adjusted. Therefore, the temporary determination and the readjustment of the installation positions during the adjustment operation are easy. Therefore, car interior equipment is installed in each of the second installation members the position of which in the up-down direction has been adjusted with respect to the first installation member mounted to the roof body shell. Therefore, regardless of the manufacturing accuracy of the roof body shell, it is possible to accurately install the car interior equipment regarding the positional relationship in the up-down direction.

Effects of the Invention

The present invention makes it possible to provide an interior equipment installation structure and a railcar capable of performing an easy installation operation of car interior equipment, and installing the car interior equipment so as to look nice.

EMBODIMENTS OF THE INVENTION

Hereinafter, an embodiment of the present invention will be described with reference to the drawings.

<Interior Installation Structure>

Figure 1:
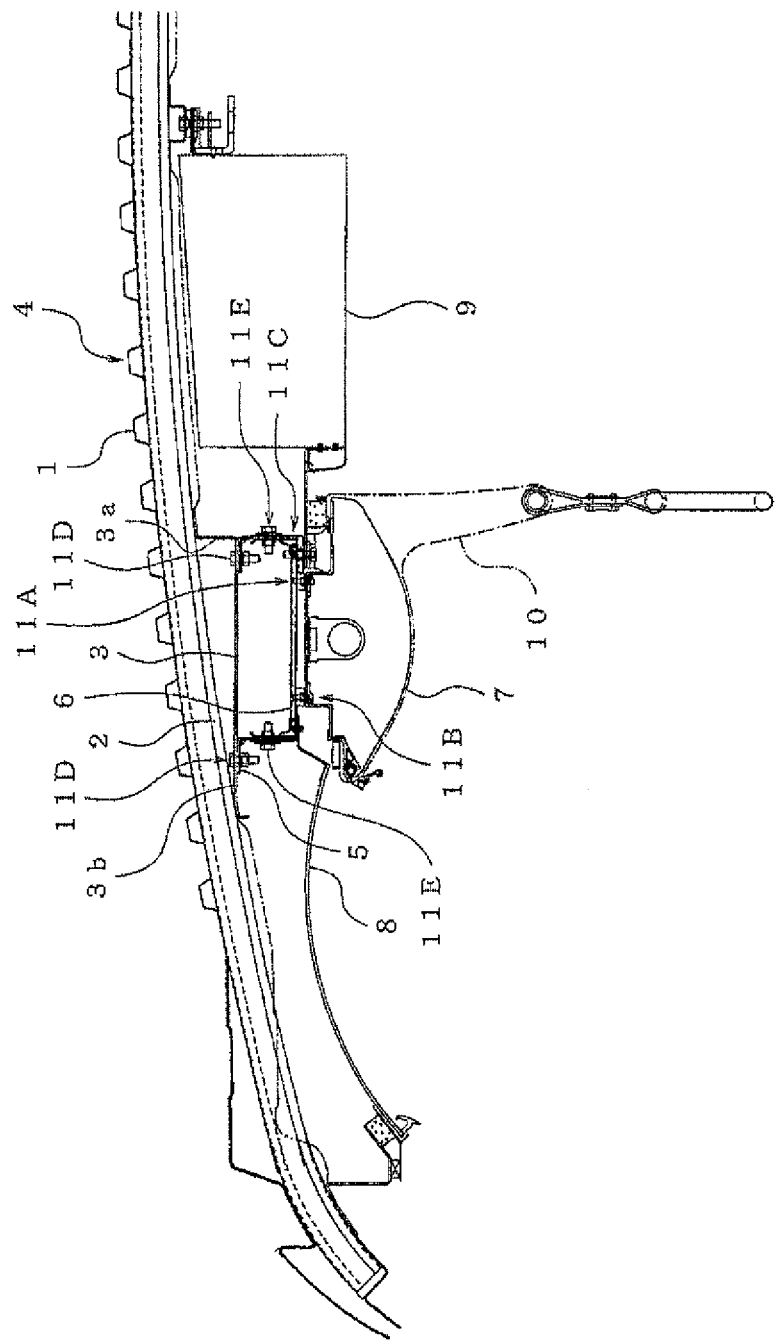
FIG. 1 is a cross-sectional view illustrating an installation structure of car interior equipment to a roof body shell as an embodiment of an interior equipment installation structure for a railcar according to the present invention.

First, an interior installation structure according to the present embodiment will be described with reference to FIG. 1. The concept of direction in each embodiment corresponds to the concept of direction when a travelling direction of a railcar is defined as a front direction and facing the front direction. More specifically, a car longitudinal direction (a rail direction) corresponds to the front-back direction, and a car width direction (a rail sleeper direction) corresponds to the right-left direction. FIG. 1 is a cross-sectional view illustrating an installation structure of car interior equipment to a roof body shell. As shown in FIG. 1, in the present embodiment, car interior equipment (lighting appliances 7, a side ceiling 8, and an air conditioning duct 9) is not directly installed in a roof body shell 4, but installed in the roof body shell 4 through an interior installation tool (see FIGS. 2 to 9B) including a first installation member 5 and second installation members 6. In the present embodiment, the first installation member 5 and the second installation members 6 are press-formed articles manufactured by press-forming metal plate materials. However, the material is not limited to a metal plate material as long as it has a strength comparable to the strength of the metal plate material. The interior installation tool will be described in detail later.

The roof body shell 4 is mainly composed of rafters 2 which are mounted to roof outer plates 1 and extend in the car width direction (the rail sleeper direction), stringers (not shown) which extend in the car longitudinal direction between the rafters 2, and an interior equipment receiver 3 which extends in the car longitudinal direction at a car compartment side of the rafters 2. The interior equipment receiver 3 of the roof body shell 4 includes a leg portion 3a the length of which in the up-down direction of the car at a central side of the carbody is long, and a horizontal portion 3b which extends in the horizontal direction from the leg portion 3a toward an outer side of the carbody.

The car interior equipment includes the lighting appliances 7 (fluorescent lights, for example), the side ceiling 8, the air conditioning duct 9 and the like. However, the car interior equipment is not limited thereto as long as it can be installed inside the car. The identical lighting appliances 7 are installed at regular intervals in the car longitudinal direction, and hand strap receivers 10 are installed between respective adjacent ones of the lighting appliances 7. Further, the side ceiling 8 located on a car outer side of the lighting appliances 7 is installed in the second installation members 6 with mechanical fastening tools 11B. Further, the air conditioning duct 9 at the central side inside the car is installed in the second installation members 6 using fastening portions 11C.

As described above, since the first installation member 5 and the second installation members 6 are press-formed articles and therefore lightweight, the first installation member 5 and the second installation members 6 can be mounted to the roof body shell 4 with the positions thereof adjusted. Then, the lighting appliances 7 each having a large weight can be installed in the second installation members 6 using the mechanical fastening tools 11A such as bolts. That is, it is possible to accurately install the car interior equipment at a predetermined height without directly adjusting the height of each piece of the car interior equipment itself in the car up-down direction. Therefore, with the interior installation structure according to the present embodiment, the installation operation is easy, and the lighting appliances 7 and the hand strap receivers 10 can be regularly arranged with high accuracy and thereby installed so as to look nice.

Further, since the installation member 5 and 6 are press-formed articles, it is possible to form each of the installation member 5 and the installation members 6 so as to have a reinforcement portion having an L-shape or concavo-convex shape in a cross-sectional view. This makes it possible to maintain the strength even when using a thin plate, and also reduce the weight. In addition, the dimensional accuracy of a product is high, and adjustment operations when installing the car interior equipment can be reduced. When the heights of installation surfaces on an installation member are different from each other due to the shapes of respective pieces of the car interior equipment, it is difficult to produce an installation member for installing a plurality of pieces of car interior equipment therein as a single metal fitting by welding and plate bending. Conventionally, it has been necessary to prepare a plurality of installation members for respective pieces of car interior equipment. However, by manufacturing the installation member 5 and the installation members 6 as press-formed articles, it is possible to form a plurality of interior equipment installation surfaces having different heights in a single installation member, thereby making it possible to reduce the number of parts.

<First Installation Member>

Figure 2:
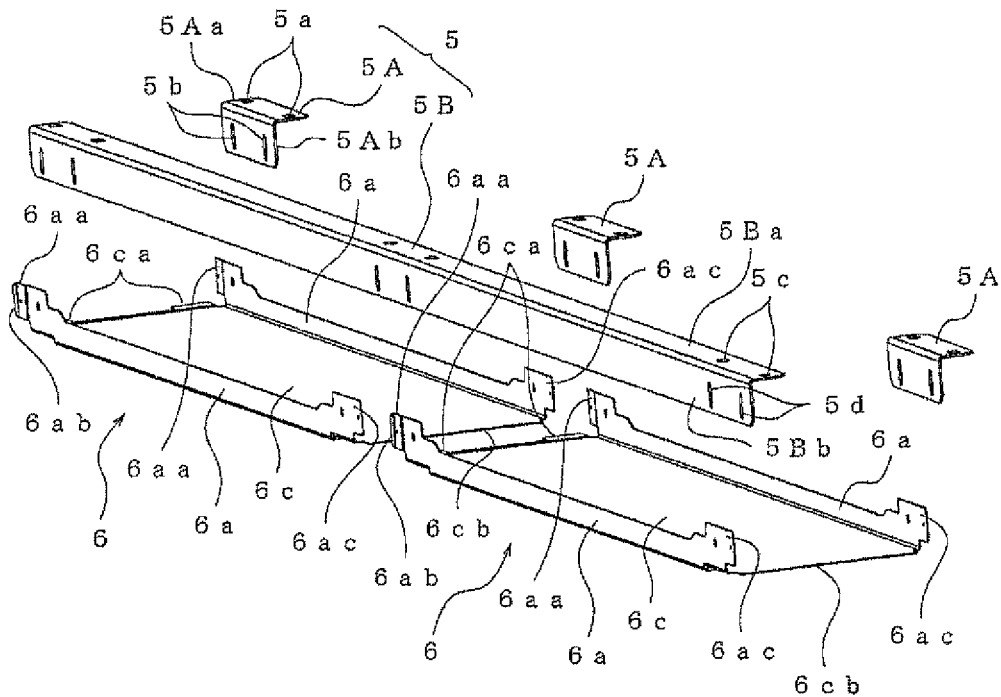
FIG. 2 is an exploded perspective view illustrating a first installation member and second installation members.
Figure 3:
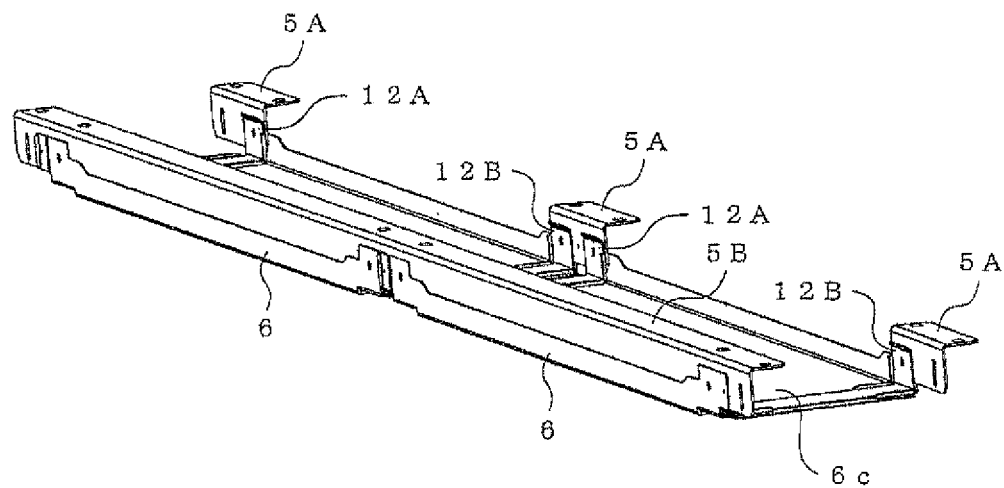
FIG. 3 is a perspective view illustrating an assembled state of the first installation member, the second installation members, and inner members.

Next, the interior installation tool will be described in detail with reference to FIGS. 2 to 6B. FIG. 2 is an exploded perspective view illustrating the first installation member and the second installation members. FIG. 3 is a perspective view illustrating an assembled state of the first installation member, the second installation members, and the inner members. As shown in FIG. 3, the interior installation tool is mainly composed of the first installation member 5, the second installation members 6, and the inner members 12. First, the first installation member 5 will be described.

As shown in FIG. 2, the first installation member 5 includes first brackets 5A and a second bracket 5B having different shapes from each other and made of metal. Each of the first brackets 5A has a horizontal portion 5Aa and a vertical portion 5Ab, and formed to have an L-shaped cross section. The horizontal portion 5Aa is to be attached to the roof body shell 4, and has mounting holes 5a formed thereon. Further, the vertical portion 5Ab extends in a direction perpendicular to the horizontal portion 5Aa, and has a pair of elongated holes (through holes) 5b formed thereon, the elongated holes 5b extending in parallel to the car up-down direction. Further, the first brackets 5A are arranged at a pitch corresponding to the length of each of the lighting appliances 7 in the car longitudinal direction.

The second bracket 5B has an L-shaped cross section. The second bracket 5B is longer in the car longitudinal direction than each of the first brackets 5A. In the present embodiment, the second bracket 5B has a length approximately twice the length of each of the lighting appliances 7 in the car longitudinal direction. However, the length of the second bracket 5B is not limited thereto, and may be approximately 2500 to 4000 mm in terms of the size of the car interior equipment and workability. The second bracket 5B has a horizontal portion 5Ba and a vertical portion 5Bb. The horizontal portion 5Ba has mounting holes 5c formed at each of the center and both ends thereof in the car longitudinal direction. The vertical portion 5Bb extends in a direction perpendicular to the horizontal portion 5Ba, and has pairs of elongated holes (through holes) 5d which are formed at positions corresponding to the positions of the first brackets 5A and protrude in the car up-down direction in the same manner as the first brackets 5A. When the first brackets 5A and the second bracket 5B are in an attached state, the vertical portions 5Ab and 5Bb have a substantially parallel positional relationship with each other.

<Second Installation Member>

Next, the second installation members 6 will be described. As shown in FIG. 2, each of the second installation members 6 has vertical portions 6a which are to be attached to the first installation member 5, and the horizontal portion 6c which connects lower edges of the vertical portions 6a. The vertical portions 6a are fastened to the first brackets 5A or the second bracket 5B so that the positions thereof in the car up-down direction can be adjusted. The horizontal portion 6c has a size capable of installing car interior equipment therein, and a plurality of types of car interior equipment such as the lighting appliance 7, the side ceiling 8, the air conditioning duct 9 and the hand strap receiver 10 are installed in the horizontal portion 6c. The horizontal portion 6c may have an opening formed in a central part thereof.

Figure 4:
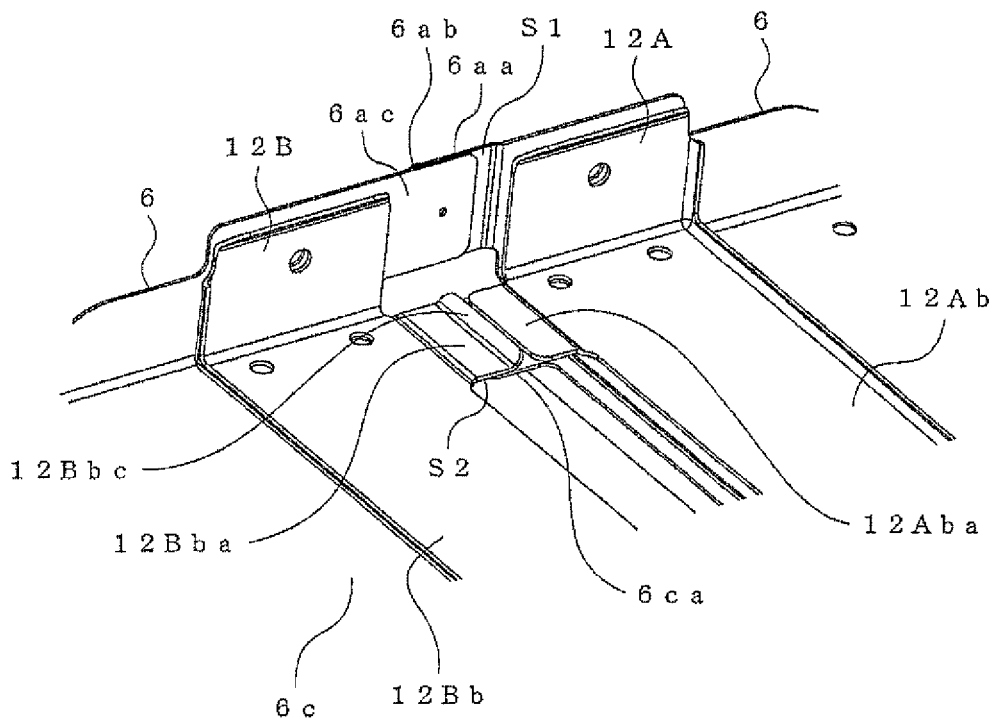
FIG. 4 is a perspective view illustrating a main part of the assembled state of FIG. 3 in an enlarged manner.
Figure 5A:
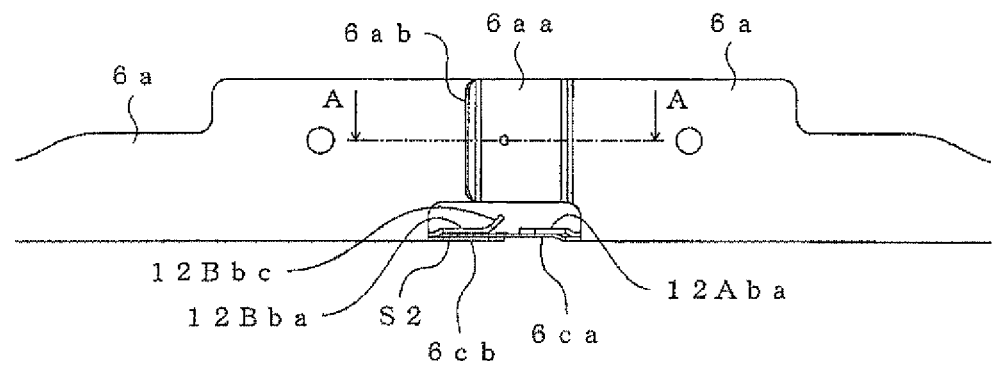
FIG. 5A is a side view, as viewed from the outside, illustrating a relationship between adjacent second installation members.
Figure 5B:
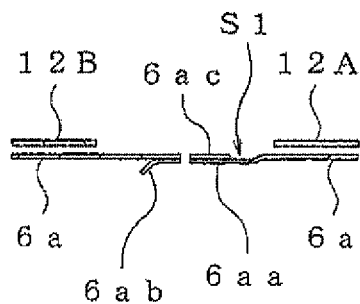
FIG. 5B is a cross-sectional view taken along line A-A of FIG. 5A.

A bent extending portion (bent portion) 6aa is formed on one of short side ends of each of the vertical portions 6a, and an engagement portion (insertion portion) 6ac is formed on the other short side end thereof. FIG. 4 is a perspective view illustrating a main part of the interior installation tool in an enlarged manner. FIG. 5A is a side view, as viewed from the outside, illustrating a relationship between adjacent ones of the second installation members. FIG. 5B is a cross-sectional view taken along line A-A of FIG. 5A. As shown in FIG. 4, the bent extending portion 6aa has a step with respect to the vertical portion 6a in the car width direction, and is bent outward and extends in the longitudinal direction of the vertical portion 6a. The bent extending portion 6aa has an inclined guide portion 6ab formed at the distal end thereof (see FIG. 5A). A space S1 is formed between the bent extending portion 6aa and the vertical portion 6a by the step. The engagement portion 6ac extends in the longitudinal direction of the vertical portion 6a.

Bent insertion portions 6ca are formed on one of short side ends of the horizontal portion 6c (on the side at which the bent extending portion 6aa is formed), and an extending portion 6cb is formed on the other short side end thereof. The bent insertion portions 6ca are formed on respective both sides in the car width direction. As shown in FIG. 5A, each of the bent insertion portions 6ca has a step with respect to the horizontal portion 6c toward the upper direction of the car, and is bent toward the upper direction of the car and extends in the longitudinal direction of the horizontal portion 6c. Further, the extending portion 6cb is formed throughout the car width direction of the horizontal portion 6c, and extends in the longitudinal direction thereof. The number and the location of each of the bent insertion portions 6ca and the extending portion 6cb are not limited to those described above.

<Inner Member>

Figure 6A:
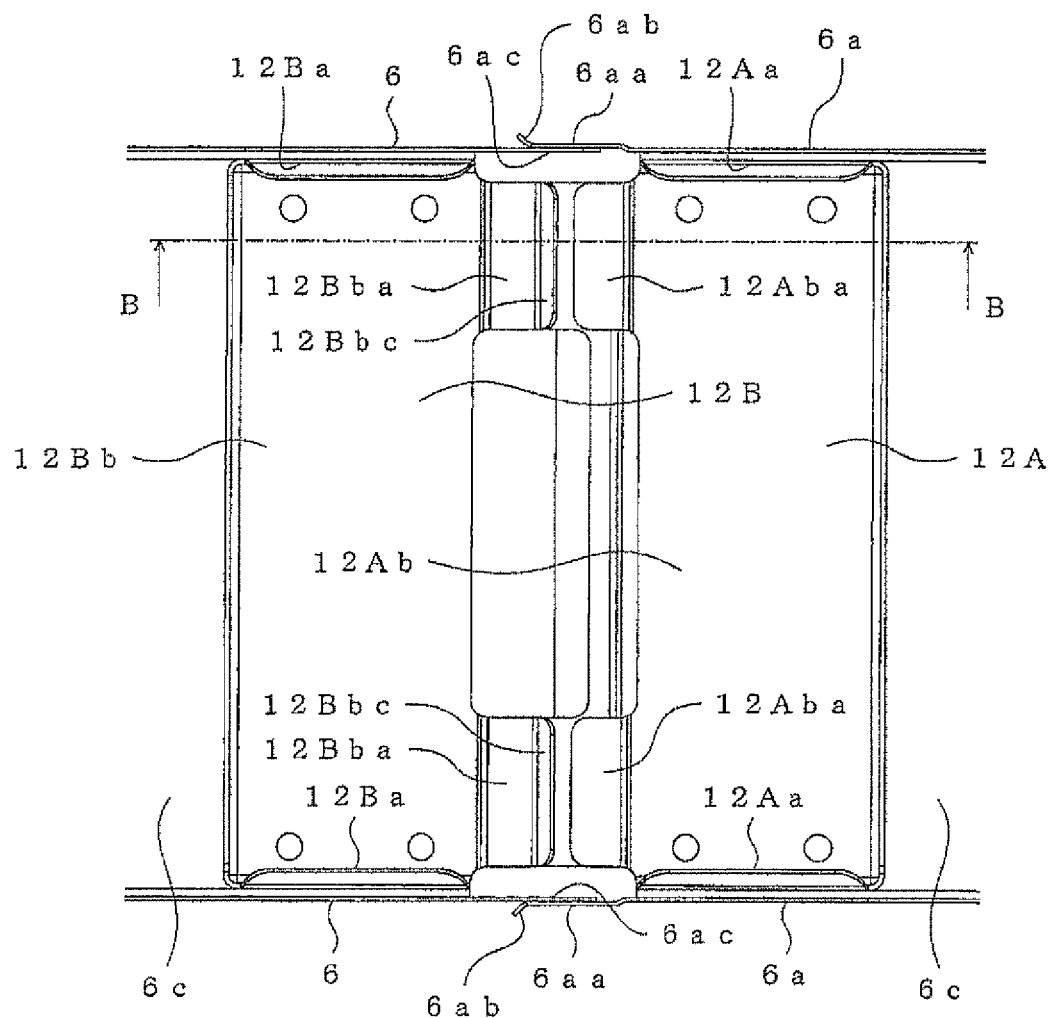
FIG. 6A is a plan view illustrating the relationship between the adjacent second installation members.
Figure 6B:
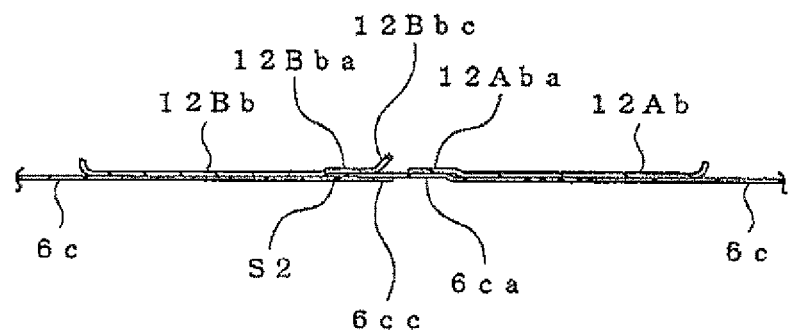
FIG. 6B is a cross-sectional view taken along line B-B of FIG. 6A.

Next, the inner members 12A and 12B will be described. FIG. 6A is a plan view illustrating the relationship between adjacent second installation members. FIG. 6B is a cross-sectional view taken along line B-B of FIG. 6A. As shown in FIGS. 3 and 6A, the inner members 12A and 12B are attached to respective both short sides of each of the second installation members 6 along the inner circumferential surface thereof. As shown in FIG. 6A, the inner member 12A has two vertical portions 12Aa and a horizontal portion 12Ab which connects lower edges of the vertical portions 12Aa, and the inner member 12B has two vertical portions 12Ba and a horizontal portion 12Bb which connects lower edges of the vertical portions 12Ba.

Bent extending portions 12Aba are formed on the inner member 12A which is provided at the same side in which the bent insertion portions 6ca are formed. As shown in FIGS. 4 and 6B, each of the bent extending portions 12Aba is bent toward the upper direction of the car along an upper surface of the corresponding bent insertion portion 6ca and extends in the longitudinal direction of the second installation member 6, and has the same width as the width of each of the bent insertion portions 6ca.

Further, bent extending portions (inner member bent portions) 12Bba are formed on the inner member 12B which is provided at the same side in which the extending portion 6cb is formed. Each of the bent extending portions 12Bba has approximately the same width as the width of the adjacent bent extending portion 12Aba. Each of the bent extending portions 12Bba has a step with respect to the horizontal portion 12Bb toward the upper direction of the car, is bent toward the upper direction of the car, and has an inclined guide portion 12Bbc formed on the distal end thereof. In a state where the inner member 12B is disposed on the corresponding second installation member 6, a gap S2 which has a width corresponding to the thickness of the second installation member 6 is formed between each of the bent extending portions 12Bba and the extending portion 6cb.

<Assembly Process>

Figure 7:
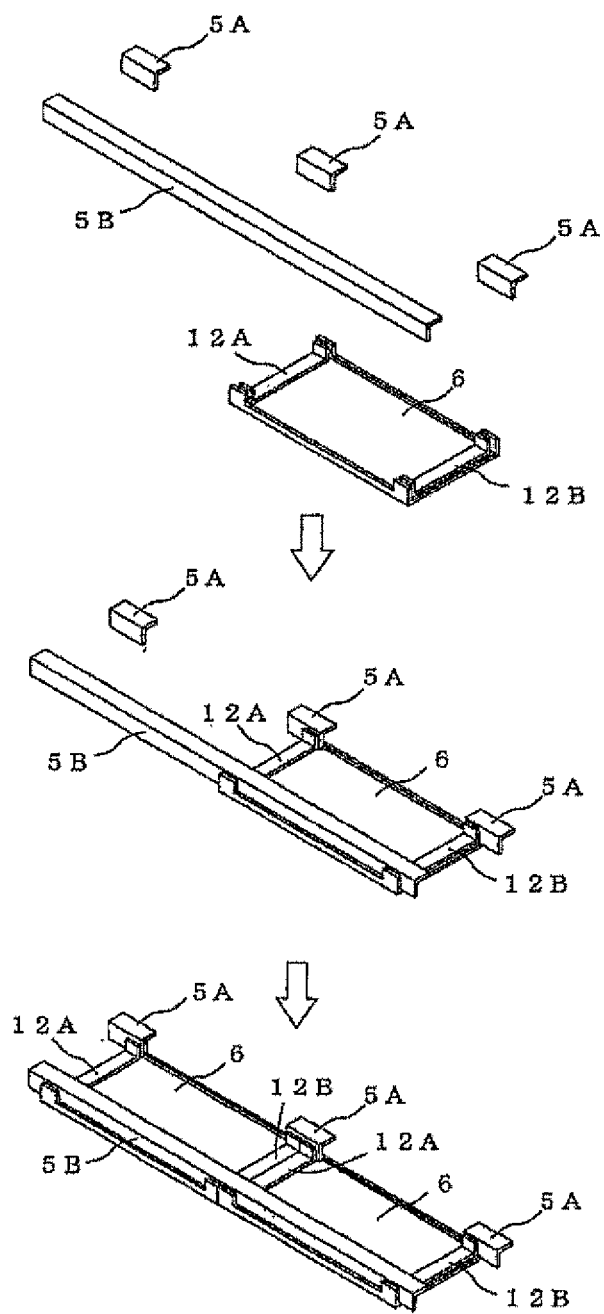
FIG. 7 is a schematic view illustrating an assembly process of an interior installation tool.

Next, an assembly process of the interior installation tool will be described with reference to FIG. 7. FIG. 7 is a schematic view illustrating the assembly process of the interior installation tool. First, the first brackets 5A and the second bracket 5B are mounted to the interior equipment receiver 3 of the roof body shell 4 throughout the longitudinal direction of the car using mechanical fastening tools 11D such as bolts (see FIG. 1). At this point, the first brackets 5A are in a temporarily fixed state. On the other hand, the second bracket 5B is firmly fixed to the interior equipment receiver 3 because the positions thereof become reference positions for the assembly operation. Further, as shown in the top diagram in FIG. 7, the second installation member 6 and the inner members 12A and 12B are previously assembled to each other (hereinafter, an integrated body of these members is referred to as "pre-assembly"). At this time, the second installation member 6 and the inner members 12A and 12B are completely fixed by spot welding. In this case, gaps are formed between the vertical portion 12Aa of the inner member 12A and the vertical portion 6a of the second installation member 6 and between the vertical portion 12Ba of the inner member 12B and the vertical portion 6a of the second installation member 6 (see FIG. 5B).

Then, as shown in the middle diagram in FIG. 7, the pre-assembly is attached to two first brackets 5A and one second bracket 5B. Specifically, the first brackets 5A and the second bracket 5B are inserted into the gaps between the inner member 12A and the second installation member 6 and between the inner member 1211 and the second installation member 6. Then, the positions of the first brackets 5A are adjusted so as to horizontally support the pre-assembly. Then, the first brackets 5A are firmly fixed to the interior equipment receiver 3 (final fastening). In the present embodiment, bolts are used as mechanical fastening tools 11E for this fixing. However, the mechanical fastening tools 11E are not limited to bolts, as long as they are fixing tools capable of preventing deviation of the positional relationship between the first installation member 5 and the second installation member 6 by the axial force thereof. At this point, the pre-assembly is kept in a temporarily fixed state with the first brackets 5A and the second bracket 5B.

Then, as shown in the bottom diagram in FIG. 7, another new pre-assembly other than the above-described one is attached to the first brackets 5A and the second bracket 5B. Specifically, the engagement portion 6ac of the second installation member 6 to be newly attached is inserted into the space S1 of the previously attached second installation member 6 (pre-assembly) (see FIG. 4). Further, each of the bent insertion portions 6ca of the previously attached second installation member 6 is guided by each of the inclined guide portions 12Bbc of the second installation member 6 to be newly attached and inserted into the gap S2. Since each of the bent insertion portions 6ca is inserted into the gap S2 in this manner at the time of the attachment, it is possible to perform positioning of the second installation member 6 in the car longitudinal direction. Then, the position of another first bracket 5A which has not yet been fixed is adjusted so as to horizontally support the newly attached pre-assembly. Then, this first bracket 5A is firmly fixed to the interior equipment receiver 3 (final fastening). Also at this point, the pre-assembly is kept in a temporarily fixed state. At this time, the two adjacent second installation members 6 are supported by the same first installation member 5 (the first brackets 5A and the second bracket 5B) at a border region therebetween. Thereafter, the above operation is performed throughout the car longitudinal direction.

Then, after confirming that the respective pre-assemblies (the second installation members 6) are horizontally aligned, all of the pre-assemblies are completely fixed to the first brackets 5A and the second bracket 5B. This fixing is performed using the mechanical fastening tools 11E (first fixing tools fixed by the axial force). After fixing the pre-assemblies using the mechanical fastening tools 11E, through holes are formed on both of the first and second installation members 5 and 6, and the second installation members 6 are fixed to the first installation member 5 (the brackets 5A and 5B) with fixing tools such as rivets (second fixing tools fixed by the shearing force). As a result, the second installation members 6 do not get displaced, and the positions thereof are maintained in an adjusted state for a long period of time in spite of vibrations caused by a running railcar.

The assembly process of the interior installation tool has been described as above. The car interior equipment is installed in the interior installation tool assembled in the above manner. Further, there are cases where a high strength is required in the installation position (for example, a case where the hand strap receivers 10 in the ceiling are installed) and where a strength is less required (for example, lightning appliances in the ceiling are installed) depending on the types of car interior equipment to be installed. Therefore, in the present embodiment, each of the hand strap receivers 10 the installation position of which is required to have a high strength is installed in an overlapped portion between the installation members 5 and 6. According to such installation, it is not necessary to increase the strength of the entire installation members 5 and 6, thereby making it possible to minimize the increase of the weight.

As described above, in the present embodiment, the ends of the adjacent installation members 6 are inserted into each other so that the weights thereof are supported to some extent, thereby making it possible to reduce the burden of an operator. As a result, it is possible to achieve the operation by a single operator. Further, since the insertion portions are constituted by the inner members 12A and 12B, the manufacturability can be improved. Further, since the insertion operation is made easy by virtue of the inclined guide portion 12Bbc, the workability can be improved. Further, since the installation members 5 and 6 are connected to each other with the mechanical fastening tools capable of unfastening and fastening as necessary to perform the necessary dimensional adjustment, the temporary determination and the readjustment of the positions of the second installation members 6 are made easy. Further, since the installation members 5 and 6 are fixed to each other with the fixing tools such as rivets which cannot be unfastened after the completion of the positioning and the adjustment, the reliability can be improved. Further, a fixing tool used in this fixing is not limited to a rivet, but may be another fixing tool capable of performing the fixing by the shearing force. For example, after the positions of the first installation member 5 and the second installation members 6 are adjusted, through holes may be formed on the first installation member 5 and the second installation members 6, then tapped to form threaded screw holes, and the first installation member 5 and the second installation members 6 may be fixed to each other with bolts or the like.

<Effects of Present Embodiment>

As described above, the interior equipment installation structure for a railcar according to the present embodiment is provided with the first installation member 5 which can be mounted to the roof body shell of the railcar, and the second installation members 6 each including the horizontal portion 6c which is capable of installing car interior equipment therein and vertical portions 6a which are provided on the respective long side ends of the horizontal portion 6c and attached to the first installation member 5 so that the positions thereof can be adjusted in the up-down direction. Therefore, the position adjustment is necessary to be performed only for the first installation member 5 and the second installation members 6 both of which are lightweight, and a detailed position adjustment operation for each piece of heavy car interior equipment is not necessary. Therefore, the installation operation of car interior equipment is easy, and the installability is therefore improved. In addition, since the installation operation is easy, when pieces of car interior equipment are regularly arranged, it is possible to install the car interior equipment so as to look nice.

Further, when a plurality of pieces of car interior equipment are installed in a single second installation member 6, the position adjustment is required to be performed only once for the single second installation member 6, and not required to be performed for each piece of the car interior equipment. As a result, a time required for the position adjustment can be significantly reduced.

Further, since each of the second installation members 6 is mounted to the first installation member 5 so that the position thereof can be adjusted, the temporary determination and the readjustment of the installation position during the adjustment operation is easy. Therefore, car interior equipment is installed in each of the second installation members 6 the position of which in the up-down direction of the car has been adjusted with respect to the first installation member 5 mounted to the roof body shell 4. Therefore, regardless of the manufacturing accuracy of the roof body shell 4, it is possible to accurately install the car interior equipment regarding the positional relationship in the up-down direction of the car.

Further, in the present embodiment, the first installation member 5 has one end portion (horizontal portion) 5Aa and the other end portion (vertical portion) 5Ab of the first bracket 5A as well as one end portion (horizontal portion) 5Ba and the other end portion (vertical portion) 5Bb of the second bracket 5B, the one end portions extending in the horizontal direction and the other end portions extending in the vertical direction. The through holes (elongated holes) 5b and 5d extending in the up-down direction are formed on the respective other end portions. Each of the second installation members 6 is attached to the first installation member 5 so that the position thereof can be adjusted in the up-down direction with the fixing tools 11E passing through the through holes 5b and 5d. Therefore, it is possible to attach each of the second installation members 6 to the first installation member 5 so that the position thereof can be adjusted in the car up-down direction with a simple structure.

Further, in the present embodiment, the first installation member 5 and the second installation members 6 are fixed to each other with the first fixing tools 11E fixed by the axial force and the second fixing tools fixed by the shearing force. Therefore, since the first installation member 5 and the second installation members 6 are fixed to each other with the first fixing tools 11E and the second fixing tools, the relative position between the installation members does not get displaced after the completion of the adjustment, thereby making it possible to ensure the reliability of the installation. In addition, it is possible to maintain the appearance when the car interior equipment is installed for a long period of time.

Further, in the present embodiment, the first installation member 5 has the first brackets 5A and the second bracket 5B. The second bracket 5B is longer in the longitudinal direction than each of the first brackets 5A. The first brackets 5A and the second bracket 5B support the respective vertical portions 6a of each of the second installation members 6. Therefore, since the first brackets 5A and the second bracket 5B support the respective vertical portions 6a which are provided on the respective long side ends of each of the second installation members 6 in which the car interior equipment is installed, even relatively heavy car interior equipment can be stably installed with excellent weight balance.

Further, in the present embodiment, the second installation members 6 are continuously arranged along the longitudinal direction of the second installation members 6, and each adjacent ones of the second installation members 6 are connected to each other by a single first installation member 5.

Therefore, since pieces of car interior equipment are installed and arranged in the second installation members 6 which are continuously arranged (namely, repeatedly arranged) with the positions thereof adjusted in the car up-down direction, it is possible to accurately install pieces of car interior equipment which are continuously arranged along the car longitudinal direction or the car width direction so as to look nice. In addition, each adjacent ones of the second installation members 6 can be attached by a single first installation member 5, thereby making it possible to reduce the number of parts.

In the meantime, as described above, the second installation members 6 are not constructed as a single part extending throughout the entire length of the car. Therefore, when identical parts (namely, the second installation members 6) are continuously installed at a certain pitch in the same manner as the car interior equipment, it is necessary to align the surfaces in which the car interior equipment is installed between the adjacent second installation members 6 in order to install the car interior equipment so as to look nice.

Accordingly, in the present embodiment, each of the second installation members 6 has the bent portion (bent extending portion) 6aa which is bent outward and extends in the longitudinal direction of the second installation members 6 at one of the short side ends of each of the vertical portions 6a and the insertion portion 6ac which extends in the longitudinal direction of the vertical portion 6a at the other short side end thereof, and the space S1 is formed between the bent portion 6aa and the vertical portion 6a. The insertion portion 6ac formed on one of adjacent ones of the second installation members 6 is inserted into the space S1 formed at the other second installation member and connected thereto. Therefore, even when the second installation members 6 are not constructed as a single part extending throughout the entire length of the car, but constructed by continuously installing the identical parts at a certain pitch in the same manner as the car interior equipment, the plurality of second installation members 6 can be accurately installed in the car longitudinal direction. Especially, since the insertion portion 6ac formed on one of adjacent ones of the second installation members 6 is inserted into the space S1 formed at the other second installation member 6 and connected thereto, it is possible to perform the position adjustment at the vertical portions 6a of the second installation member 6. In addition, the weight of each of the second installation members 6 is supported to some extent by the inserting connection structure, thereby making it possible to reduce the burden of an operator and to make the installation operation easy. As a result, the adjustment and installation operations can be performed by a single operator. Further, even when each of the second installation members 6 is formed of a thin plate for weight saving, the strength required for the second installation members 6 as a whole can be ensured by using the overlapped portions by the insertion structure.

Further, the interior equipment installation structure of the present embodiment further includes the inner members 12A and 12B which are attached to the respective short side ends of each of the second installation members 6. Each of the second installation members 6 has the bent insertion portions 6ca each of which is bent upward and extends in the longitudinal direction of the second installation members 6 at one of the short side ends of the horizontal portion 6c, and the extending portion 6cb which extends in the longitudinal direction of the second installation members 6 at the other short side end thereof. The inner member 12B has the inner member bent portions (bent extending portions) 12Bba each of which is bent upward and extends in the longitudinal direction of the second installation members 6 at one end thereof. The gap S2 is formed between each of the inner member bent portions 12Bba and the extending portion 6cb. Each of the bent insertion portions 6ca formed on one of adjacent ones of the second installation members 6 is inserted into the gap S2 formed at the other second installation member 6 and connected thereto. Therefore, the position adjustment can be performed also in the horizontal portion 6c of each of the second installation members 6. In addition, the weight of each of the second installation members 6 can be further supported by the inserting connection structure in which each of the bent insertion portions 6ca formed on one of adjacent ones of the second installation members 6 is inserted into the gap S2 formed at the other second installation member 6, thereby making it possible to further reduce the burden of an operator.

Further, in the present embodiment, each of the inner member bent portions 12Bba has a distal end which is inclined so as to guide the insertion of the corresponding bent insertion portion 6ca. Therefore, since the insertion of the bent insertion portions 6ca are guided, the insertion/connection operation is made easy, and the workability is therefore improved. In addition, since adjacent ones of the second installation members 6 are fixed to each other in the bent insertion portions 6ca, the adjacent second installation members 6 can be fastened or fixed with the same mechanical fastening tool or fixing tool. Therefore, the number of mechanical fastening tools or fixing tools can also be reduced.

Further, in the present embodiment, the horizontal portion 6c of each of the second installation members 6 corresponds to the length of the lightning appliance and is capable of installing the lighting appliance therein. A hand strap receiver can be installed between adjacent ones of the second installation members 6 as well as in the overlapped portion between the inner members 12A and 12B and the second installation members 6. Therefore, it is possible to provide lighting appliances such as fluorescent lights as pieces of car interior equipment which are continuously (repeatedly) arranged so as to look nice. Further, the hand strap receiver is supported in the overlapped portion formed by inserting each of the bent insertion portions 6ca into the gap S2, which means that the hand strap receiver can be supported in a portion formed by overlapping plate materials having excellent strength. Therefore, it is possible to minimize the increase of weight of the installation members as a whole.

Further, in the present embodiment, the first installation member 5 and the second installation members 6 are press-formed articles manufactured by press-forming metal plate materials. Since an installation member requires strength, the installation member is often made of metal, and is therefore heavy. As a result, the adjustment and installation operations of the installation member take long time. However, by manufacturing the installation member as a press-formed article, even when a thin plate is used for weight saving, a required strength can be obtained. In addition, the dimensional accuracy of the installation member is improved, and the adjustment operations at the time of installing the car interior equipment can be reduced. Further, the first installation member 5 and the second installation members 6 may also have a complicated shape. Especially when installing pieces of car interior equipment such as lighting appliances such as fluorescent lights in which a plurality of identical parts are continuously arranged, only the first installation member 5 and the second installation members 6 are used by continuously, namely, repeatedly arranging these installation members 5 and 6. Therefore, there is no cost disadvantage even when the installation members 5 and 6 are manufactured by press-forming.

Further, in the present embodiment, each of the second installation members 6 has a plurality of interior equipment installation surfaces, and is capable of installing a plurality of types of car interior equipment therein. Therefore, a plurality of pieces of car interior equipment can be installed in a single installation member (the second installation member 6) the position of which has been adjusted, thereby making it possible to easily perform the position adjustment operation and the installation operation. Conventionally, when the heights of installation members are not equal to each other due to the shapes of respective pieces of car interior equipment, it is difficult to manufacture an installation member as a single installation member only by processing such as welding or plate bending, and a plurality of installation members have therefore been used. However, the present embodiment can eliminate such conventional defect.

The present invention can also be performed by the following modifications in addition to the above embodiment.

<Modification 1>

Although, in the above embodiment, the elongated holes 5b and 5d for the position adjustment in the car up-down direction are formed on the first installation member 5 (the brackets 5A and 5B), the elongated holes 5b and 5d may be formed on the second installation members.

<Modification 2>

In the above embodiment, the gap S2 is formed between each of the bent extending portions 12Bba of the inner member 12B and the extending portion 6cb of each of the second installation members 6, and each of the bent insertion portions 6ca of the adjacent second installation member 6 is inserted into the gap S2. However, the bent extending portions 12Bba or the extending portion 6cb and the bent insertion portions 6ca may merely be overlapped with each other without forming such a gap. Further, when a piece of car interior equipment supported by each of the second installation members 6 is lightweight, the inner members 12A and 12B (inner members) may also be omitted.

<Modification 3>

Figure 8:
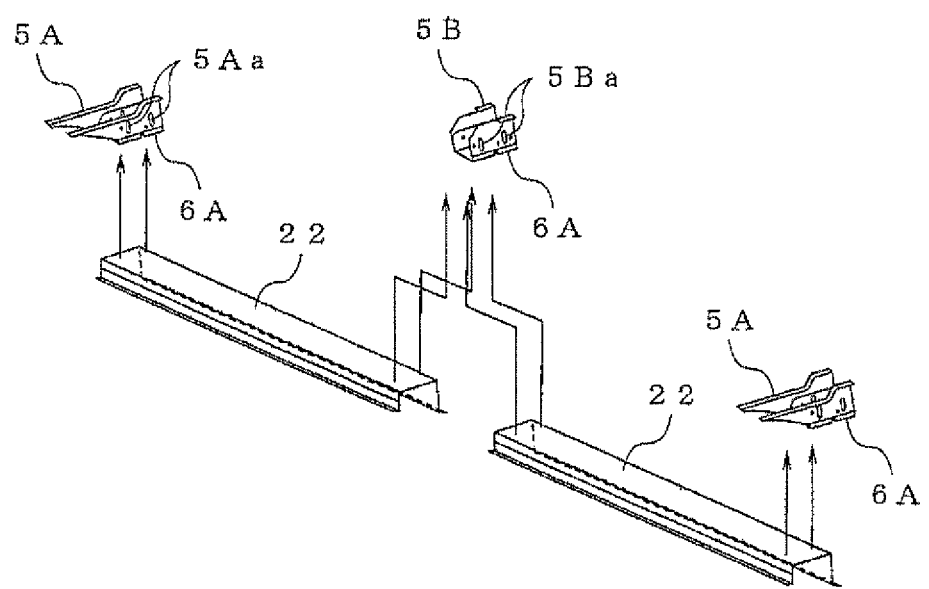
FIG. 8 is an exploded perspective view of another embodiment.
Figure 9A:
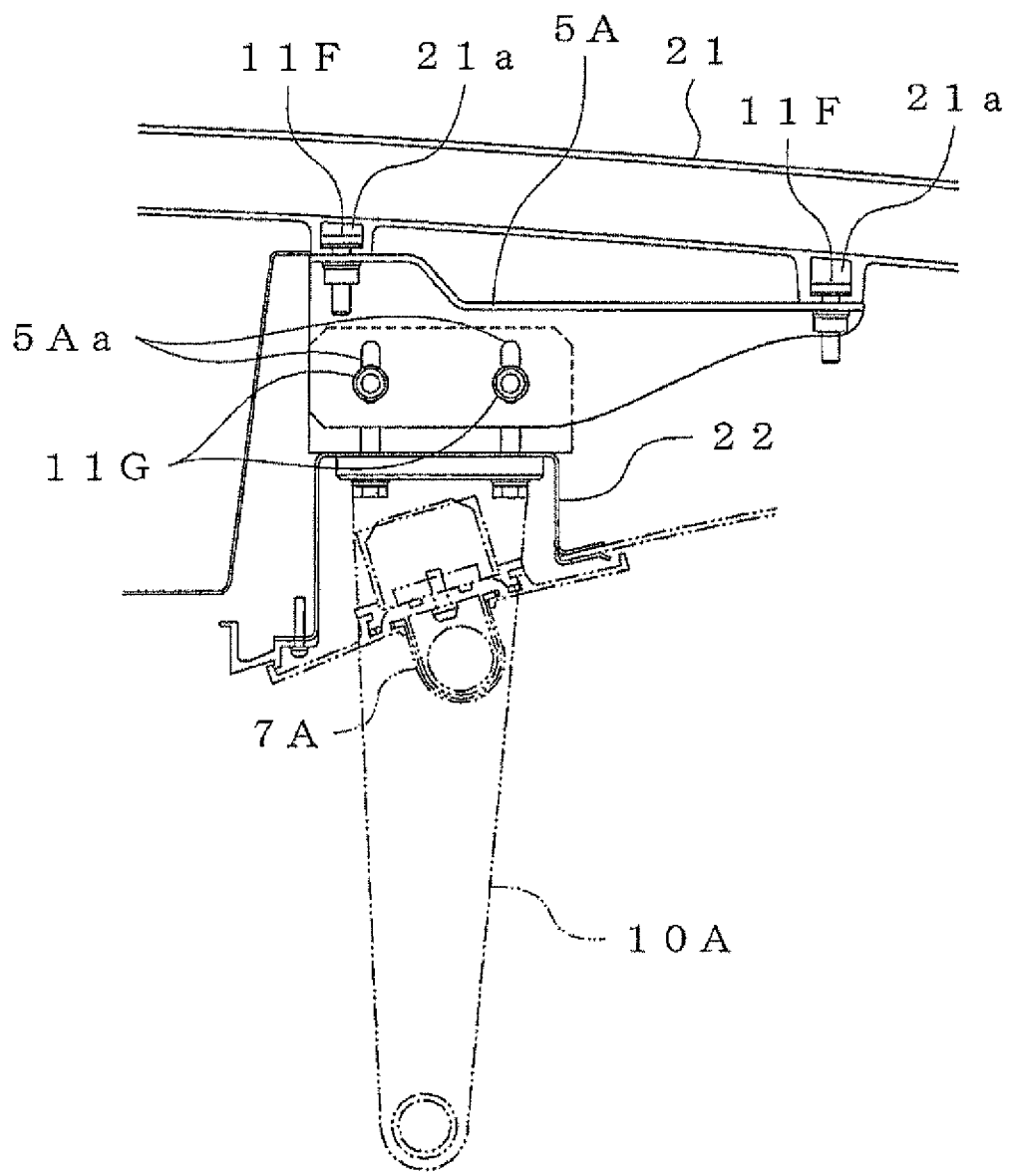
FIG. 9A is a front view illustrating an installed state of another embodiment shown in FIG. 8.
Figure 9B:
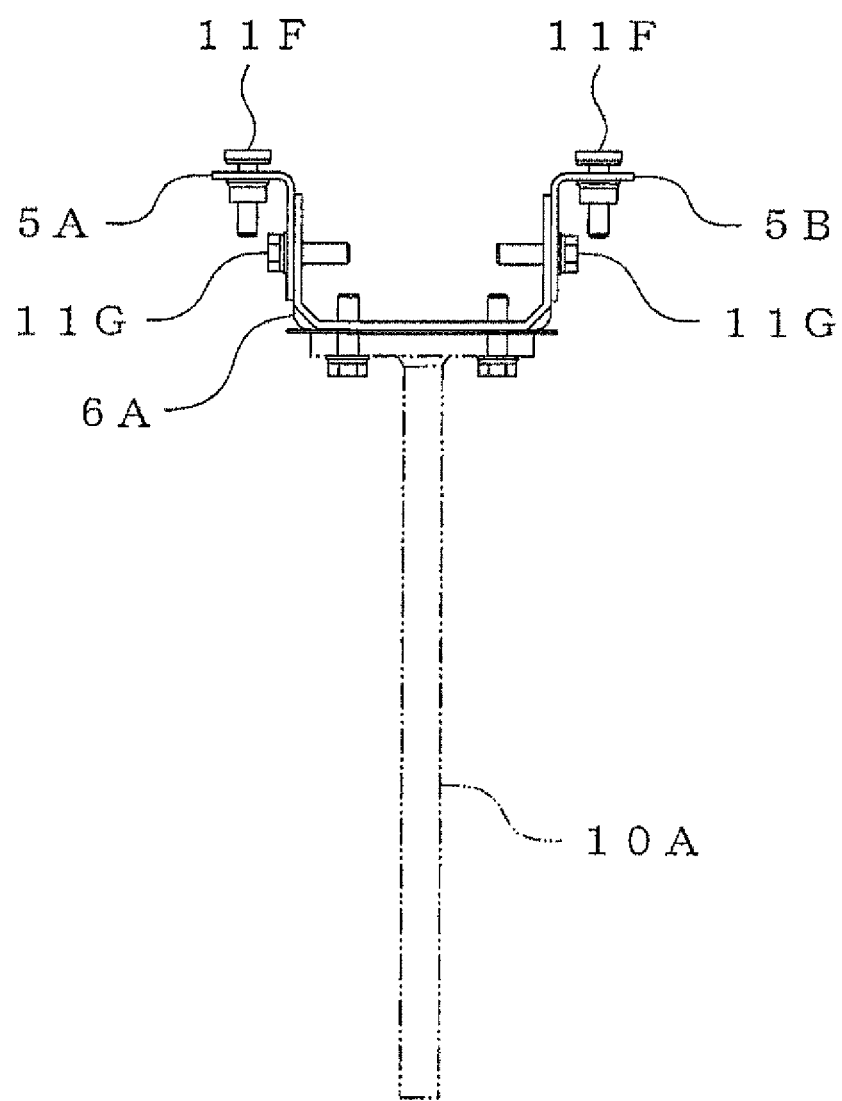
FIG. 9B is a side view illustrating the installed state of another embodiment shown in FIG. 8.

Although, in the above embodiment, the first installation member 5 (the brackets 5A and 5B) are installed so that the longitudinal direction of the first installation member 5 corresponds to the car longitudinal direction, the longitudinal direction of the first installation member 5 may correspond to the car width direction. For example, as shown in FIGS. 8 to 9B8, the first installation member 5 (the brackets 5A and 5B) is attached to suspending grooves 21a which are formed on a roof body shell 21 and extend in the car longitudinal direction using mechanical fastening tools 11F by adjusting the position thereof so that the longitudinal direction of the installation member 5 corresponds to the car width direction. Further, the elongated holes 5b and 5d are formed on the first brackets 5A and the second bracket 5B (the first installation member 5). The first installation member 5 and the second installation members 6 are fastened with each other with mechanical fastening tools 11G. In this case, since the elongated holes 5b and 5d are formed, the position adjustment in the car up-down direction can be performed. After the completion of the position adjustment in the car up-down direction, the other constituent members are fixed with the fixing tools such as rivets in the same manner as in the above embodiment. Further, frames 22 for supporting lighting appliances 7A such as fluorescent lights which are arranged in the car longitudinal direction are attached to the second installation members 6A. A hand strap receiver 10A may be installed in a portion in which plate materials constituting the installation members are overlapped.

Description of Reference Signs

1: roof outer plate
4: roof body shell
5: first installation member
5b: elongated hole (through hole)
5d: elongated hole (through hole)
5A: first bracket
5B: second bracket
6, 6A: second installation member
6a: vertical portion
6aa: bent extending portion (bent portion)
6ab: inclined guide portion
6ac: engagement portion (insertion portion)
6c: horizontal portion
6ca: bent insertion portion
6cb: extending portion
7: lighting appliance
8: side ceiling
9: air conditioning duct
10: hand strap receiver
11A to 11G: mechanical fastening tool (first fixing tool)
12A, 12B: inner member
12Aa, 12Ba: vertical portion
12Ab, 12Bb: horizontal portion
12Aba: bent extending portion
12Bba: bent extending portion (inner member bent portion)
12Bbc: inclined guide portion
S1: space
S2: gap

The invention claimed is:

1. An interior equipment installation structure for a railcar comprising:
   a first installation member capable of being mounted to a roof body shell of a railcar; the first installation member having one end extending in the horizontal direction and the other end extending in the vertical direction, the other end having through holes extending in an up-down direction; and
   at least two adjacent second installation members each including a horizontal portion capable of installing car interior equipment therein and vertical portions provided at respective long side ends of the horizontal portion and attached to the first installation member with first fixing tools passing through the through holes so that the positions of the vertical portions can be adjusted in the up-down direction, wherein
   the first installation member has first brackets and a second bracket,
   the second bracket is longer in the longitudinal direction than each of the first brackets, and
   the first brackets and the second bracket support the vertical portions of the second installation members.

2. The interior equipment installation structure for a railcar according to claim 1, wherein
   the second installation members are fixed to the first installation member with the first fixing tools after the positions of the second installation members in the up-down direction are adjusted.

3. The interior equipment installation structure for a railcar according to claim 1, wherein
   the second installation members are continuously arranged along the longitudinal direction of the second installation members, and
   adjacent ones of the second installation members are connected to each other by the first installation member.

4. The interior equipment installation structure for a railcar according to claim 3, wherein each of the second installation members has a bent portion, the bent portion being bent outward and extending in the longitudinal direction of the second installation members, at one of short side ends of each of the vertical portions, and an insertion portion extending in the longitudinal direction of the vertical portions at the other short side end thereof,
a space is formed between the bent portion and a corresponding one of the vertical portions, and
the insertion portion formed on one of adjacent ones of the second installation members is inserted into the space formed at the other one of the second installation members and connected thereto.

5. The interior equipment installation structure for a railcar according to claim 4, further comprising inner members to be attached to the respective short side ends of each of the second installation members, wherein
each of the second installation members has bent insertion portions, the bent insertion portion being bent upward and extending in the longitudinal direction of the second installation members, at one of short side ends of the horizontal portion, and an extending portion extending in the longitudinal direction of the second installation members at the other short side end thereof,
one of the inner members has inner member bent portions, the inner member bent portions being bent upward and extending in the longitudinal direction of the second installation members, at one side thereof,
a gap is formed between each of the inner member bent portions and the extending portion, and
each of the bent insertion portions formed on one of adjacent ones of the second installation members is inserted into the gap formed at the other one of the second installation members and connected thereto.

6. The interior equipment installation structure for a railcar according to claim 3, further comprising inner members to be attached to the respective short side ends of each of the second installation members, wherein
each of the second installation members has bent insertion portions, the bent insertion portion being bent upward and extending in the longitudinal direction of the second installation members, at one of short side ends of the horizontal portion, and an extending portion extending in the longitudinal direction of the second installation members at the other short side end thereof,
one of the inner members has inner member bent portions, the inner member bent portions being bent upward and extending in the longitudinal direction of the second installation members, at one side thereof,
a gap is formed between each of the inner member bent portions and the extending portion, and
each of the bent insertion portions formed on one of adjacent ones of the second installation members is inserted into the gap formed at the other one of the second installation members and connected thereto.

7. The interior equipment installation structure for a railcar according to claim 6, wherein each of the inner member bent portions has a distal end being inclined so as to guide the insertion of a corresponding one of the bent insertion portions.

8. The interior equipment installation structure for a railcar according to claim 6, wherein
the horizontal portion of each of the second installation members corresponds to the length of a lighting appliance and is capable of installing the lighting appliance therein, and
a hand strap receiver can be installed between adjacent ones of the second installation members as well as in an overlapped portion between the inner members and the second installation members.

9. The interior equipment installation structure for a railcar according to claim 1, wherein the first installation member and the second installation members are press-formed articles manufactured by press-forming metal plate materials.

10. The interior equipment installation structure for a railcar according to claim 9, wherein each of the second installation members has a plurality of interior equipment installation surfaces, and is capable of installing a plurality of types of car interior equipment therein.

* * * * *